United States Patent
Bruijning

(10) Patent No.: US 7,958,202 B2
(45) Date of Patent: Jun. 7, 2011

(54) SYSTEM AND METHOD FOR PROCESSING TRANSACTION DATA

(75) Inventor: Jeroen Bruijning, Voorburg (NL)

(73) Assignee: Nederlandse Organisatie Voor Toegepast-Natuurweteschappelijk Onderzoek TNO, Delft (NL)

( * ) Notice: Subject to any disclaimer, the term of this patent is extended or adjusted under 35 U.S.C. 154(b) by 2385 days.

(21) Appl. No.: 10/333,564

(22) PCT Filed: Jul. 30, 2001

(86) PCT No.: PCT/EP01/08774
§ 371 (c)(1),
(2), (4) Date: Jul. 21, 2003

(87) PCT Pub. No.: WO02/10997
PCT Pub. Date: Feb. 7, 2002

(65) Prior Publication Data
US 2004/0024626 A1 Feb. 5, 2004

(30) Foreign Application Priority Data
Aug. 2, 2000 (NL) .................................. 1015854

(51) Int. Cl.
*G06F 15/16* (2006.01)
(52) U.S. Cl. .................... 709/219; 709/220; 709/238
(58) Field of Classification Search .................. 709/238, 709/219, 220
See application file for complete search history.

(56) References Cited

U.S. PATENT DOCUMENTS

| | | | |
|---|---|---|---|
| 5,931,900 A | 8/1999 | Notani et al. | |
| 6,029,174 A | 2/2000 | Sprenger et al. | |
| 6,076,092 A | 6/2000 | Goldberg et al. | |
| 6,798,740 B1 * | 9/2004 | Senevirathne et al. | 370/219 |
| 7,076,784 B1 * | 7/2006 | Russell et al. | 719/315 |

FOREIGN PATENT DOCUMENTS

| | | |
|---|---|---|
| EP | 0694838 | 1/1996 |
| EP | 0872805 | 10/1998 |
| WO | WO9946662 | 9/1999 |
| WO | WO0033217 | 6/2000 |

OTHER PUBLICATIONS

Anonymous: "Business Process Framework," Research Disclosure, No. 429, Jan. 1, 2000, p. 169, XP002172148, Havant, UK, article No. 429132.

* cited by examiner

*Primary Examiner* — Adnan Mirza
(74) *Attorney, Agent, or Firm* — McDonnell Boehnen Hulbert & Berghoff LLP

(57) ABSTRACT

Computer system provided with a software architecture for processing transaction data which comprises a platform (5) with at least one logical processing unit (21) comprising the following components: a plurality of gates (G(k)); one or more message queues (MQ(k)), these being memories for temporary storage of data; one or more databases (DB); a hierarchical structure of managers in the form of software modules for the control of the gates (G(j)), the messages queues (MQ(k)), the one or more databases, the at least one logical processing unit (21) and the platform (5), wherein the gates are defined as software modules with the task of communicating with corresponding business components (BC(j)) located outside the platform (5), which are defined as software modules for carrying out a predetermined transformation on a received set of data.

19 Claims, 4 Drawing Sheets

SYSTEM AND METHOD FOR PROCESSING TRANSACTION DATA

SCOPE OF THE INVENTION

The invention relates to a data processing system for processing transaction data.

PRIOR ART

Such a system is, for example, nowadays frequently applied in automatic invoicing processes in the telecommunications industry. Other examples relate to the processing of data and orders at banks, as well as point-of-sale records data processing. The scope of application of the invention is not, however, limited to these examples.

It is known that applications for processing transaction data have the following characteristics, amongst others:

1) Usually, very large volumes of data are processed, up to several hundred million per day;
2) the processing sequence consists of: data entry (usually automated), followed by a number of processing steps (controlled by reference information such as customer and product data in the example of invoicing), output of the desired results such as (an electronic representation of) invoices as well as process and application information for auditing;
3) comprehensive provisions are in place to protect customers' input data or restore these data in the event of incidents such as hardware or software faults, operator errors, etc.;
4) the operational management (responding to incidents such as hardware and software faults, operator errors etc.) requires great vigilance in order to achieve the required reliability;
5) there is a high degree of customized solutions, i.e. developments for or extensive modifications to the specific application;
6) such applications comprise, in addition to the actual "business functionality" (for example a description of how to determine the price of a telephone call), a considerable degree of functionality in order to steer the processing process in the right direction. This can extend from organizing the processing into a number of sub-functions to checking access privileges and determining when transactions must be created or closed;
7) because of the stringent requirements, such applications are often run on mainframe computers for the sake of reliability and the required performance.

Such applications consist of various sub-processes and in practice make use of shared data. This means that the sub-processes are organized on the basis of a common state and are highly dependent on one another. If one of the sub-processes makes an error that is linked to the shared data, this will affect all the other sub-processes. Partly for this reason, the known applications have, more in particular, the following drawbacks:

(a) processing of transactions is usually done in batches; therefore, a lot of time can pass between initiation of a transaction and processing thereof, i.e., until a batch is full enough with transactions to be processed or a certain predetermined time has passed;
(b) when only a single error occurs in the processing of a batch the entire batch with possibly a number of transactions must be carried out again;
(c) they are expensive, both to purchase and to run;
(d) the applications are difficult to change, which leads to a long time-to-market for new functionality;
(e) the applications require considerable effort for operational and functional management; and
(f) a number of generic problems ("non-business functionality") associated with computer systems on which the transaction process is running need to be solved for each new system, which in addition to unnecessary costs also increases the chance of unnecessary errors.

SUMMARY OF THE INVENTION

It is therefore an object of the present invention to provide an alternative transaction processing system that performs a transaction process on transaction input data streams on an individual basis in a limited time.

To that end, the invention provides a transaction processing system comprising:
   computer means;
   one or more input interfaces for providing an input transaction data stream to the transaction processing system;
   one or more output interfaces for outputting an output transaction data stream;
   one or more memory means for storage of intermediate transaction processing data; characterized in that the computer means comprise one or more series of transaction data processing means that are arranged to process each input transaction data stream on a single stream basis.

By providing such a series of transaction data processing means that operate on a single basis, no batch process is required. This reduces the time required to start processing input transaction data of each stream.

In an embodiment, the transaction processing system as defined above comprises a platform with at least one logical processing unit and comprising:
   the one or more series of transaction data processing units, each comprising a gate, there being at least an entry gate, an exit gate and zero or more intermediate gates;
   the one or more memory units, each comprising either a message queue, these being memories for temporary storage of data on a first-in-first-out basis, or a buffer, these being memories for temporary storage on a random access basis.

In a further embodiment the gates are defined as software modules with at least the following tasks:
   starting up a corresponding business component located outside the platform, which is defined as a software module for carrying out a predetermined transformation on a received set of data;
   sending the set of data to the corresponding business component;
   receiving a transformed set of data from the corresponding business component, that was created by the transformation of the set of data by the corresponding business component;
the entry gate and each of the intermediate gates being designed to retrieve the data to be transformed from one or more of the memory units and to store the received transformed set of data in one or more of the memory units.

Preferably, the transaction processing system comprises a hierarchical structure of managers, in the form of software modules.

These latter software modules are designed to control the gates, the message queues, the buffers, the at least one logical processing unit and the platform.

Such an architecture provides a very flexible system. Autonomous components are defined from low to high within the system. This makes it simple to replace components or add new components. Consequently, applications can be changed more easily and are also easier to manage. Moreover, changes can be implemented at lower cost.

The invention also relates to a method for processing transaction data with the aid of a transaction processing system, comprising:
  computer means;
  one or more input interfaces for providing an input transaction data stream to the transaction processing system;
  one or more output interfaces for outputting an output transaction data stream;
  one or more memory units for storage of intermediate transaction processing data; wherein the computer means comprise one or more series of transaction data processing units and the method including processing each input transaction data stream on a single stream basis.

Preferred embodiments of the present invention will now be described.

BRIEF DESCRIPTION OF THE FIGURES

The invention will now be explained by reference to a number of figures that are intended solely to illustrate the invention and do not limit its scope.

DESCRIPTION OF AN EMBODIMENT

In order to simplify the complex structures of the prior art, several independent sub-processes are defined. There are three underlying concepts:
1. Separate data streams;
2. Separation between business functionality and implementation functionality;
3. Configuration concept and management concept.
  These will be dealt with one by one.
1. Separate Data Streams The emphasis is here on the controlled processing of data in a distributed manner. This requires reliable mechanisms with clear responsibilities for the distribution of data. Such mechanisms perform a series of verifications on the data in order to determine whether data have been lost or generated during the processing. For the elaboration of a sound architecture, an industrial plant has been used as a metaphor.

In reality, a plant is managed by a plant manager. The plant manager stands at the top of the management hierarchy, that consists of other managers and/or people and resources that are managed. A plant can be construed as an installation that transforms raw materials into (end) products. The raw materials enter the plant via an entrance gate, while the (end) products leave the plant by an exit gate. Transformation of raw materials is carried out according to a predetermined plan and can comprise several process stages. The various transformation stages are often carried out in different parts of the plant, which can be referred to as "workspaces". A plant can manufacture different products from the same or different raw materials. If the transformation process is very complex and different types of raw material are transformed or combined to produce different types of products, it may be wise to subdivide the installation into several (sub)plants. The plant supports the logistics and tracing of identifiable parts of raw materials, semi-manufactured products or end products. The plant can be monitored from a central control room, which observes the status of all relevant components in the plant. From this central control room, the plant manager manages all the managers lower in hierarchy.

Figure 1:
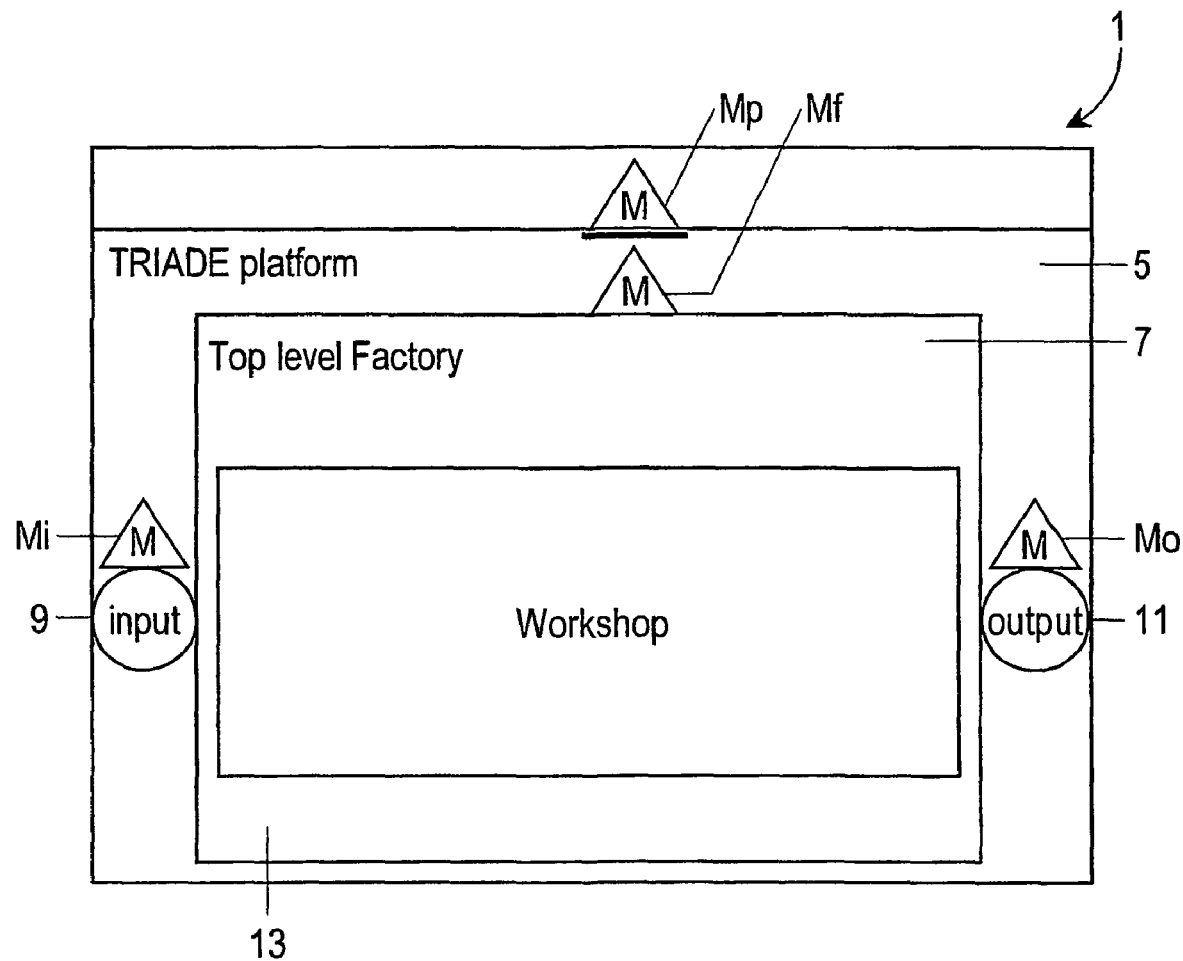
FIG. 1 shows a structure of a plant as a metaphor for the explanation of the invention.

FIG. 1 shows an overall layout of such a plant. The total set-up is indicated by reference number 1. The set-up 1 comprises a platform 5. Within the platform 5 is situated a main plant 7 in which at least one workspace 13 is located. The main plant 7 has an entrance 9 and an exit 11. The platform 5 is managed by a platform manager Mp, the main plant 7 by a plant manager Mf, the entrance 9 by an entrance manager Mi and the exit 11 by an exit manager Mo.

Instead of a workspace 13, a plurality of workspaces can be provided, arranged logistically one after the other and linked by means of conveyor belts.

The plant manager Mf controls the whole plant 7. His tasks include:
  supervision of all subordinate managers;
  instruction of subordinate managers, for example with commands such as "stop", "pause", "resume", etc.;
  taking decisions in case of problems;
  receiving status information from subordinates;
  provision of status information to superiors, in the situation as drawn in FIG. 1 corresponding with the platform manager Mp.

In some cases it may be useful to distinguish between the various types of sub-plants. Two types can be defined: a process plant and a project plant. A process plant is defined for an indefinite period for the processing of a special type of data. There may be, for example, a process plant for ATM invoicing (ATM=asynchronous transfer mode), while another process plant handles, for example, ISDN invoicing (ISDN=integrated services digital network). A project plant, on the other hand, is defined for a specific period, for example 12 months. The closure of a project plant is usually initiated by an event outside the system, which may possibly be present in the main data stream entering the plant. The actual closure of the project plant is the responsibility of the plant manager Mf and/or the hierarchy of plant managers, if there are several.

Lower in the hierarchy, a so-called non-persistent plant, for example, can be defined. In such a plant, data are not held in persistent memory. In this case, the data are stored on entering the plant. A restart point is defined with these data, and the data at the plant exit will be delayed until the restart point has reached the end of the plant. The entry data are then deleted. The advantage of this is that the data can be transported more rapidly. This type of plant does not, however, permit the use of databases that exist longer than the life-time of the plant.

Figure 2:
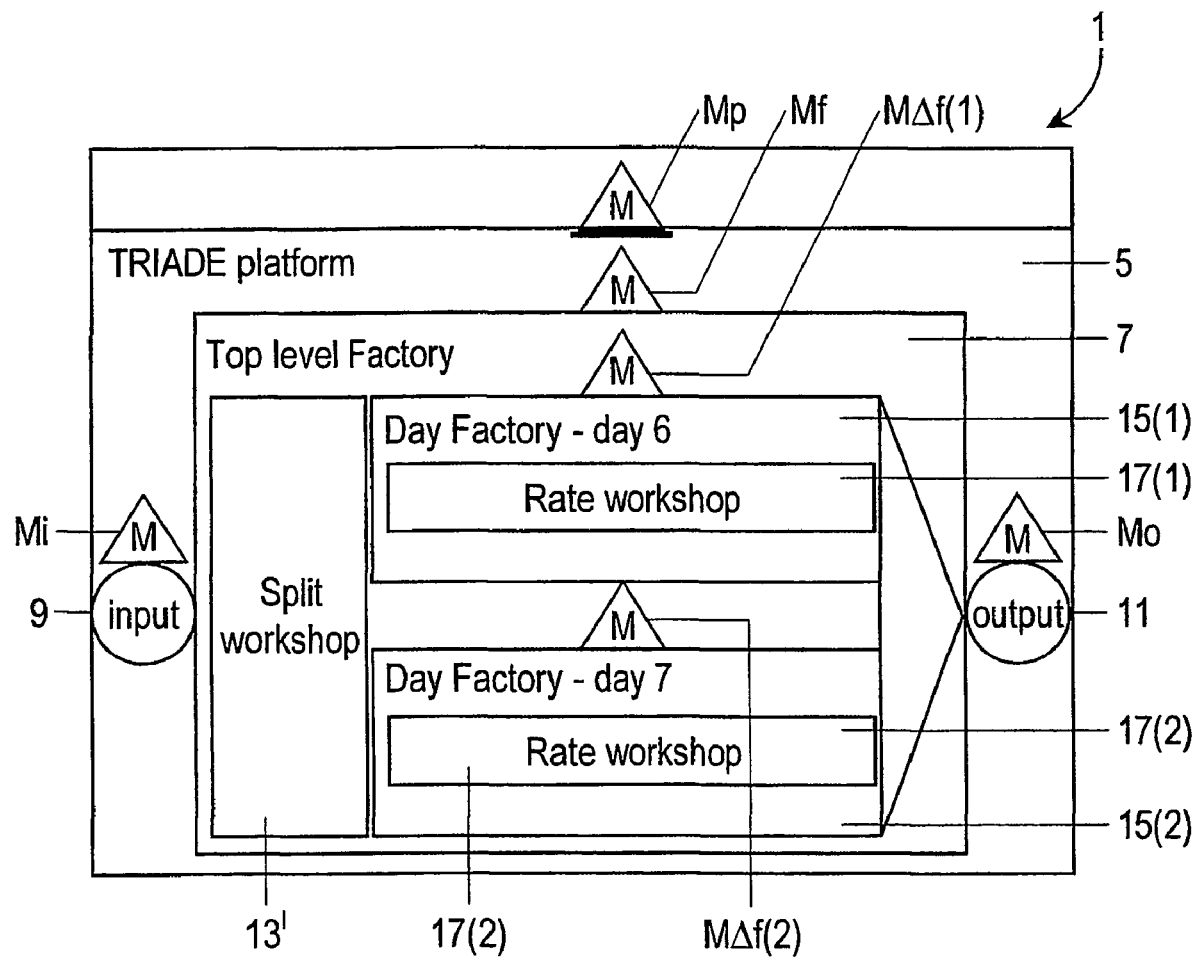
FIG. 2 shows a structure of a plant with sub-plants for the explanation of the invention.

FIG. 2 shows an example of a plant that comprises several sub-plants. In FIG. 2 the same reference numbers refer to the same components as in FIG. 1. Instead of a workspace 13, FIG. 2 has a splitter workspace 13'. This splitter workspace 13' can be seen as a space in which input data, which entered via the entrance 9, are split into parts which are operated on by various sub-plants. FIG. 2 shows two sub-plants 15(1), 15(2). Of course, there can be more than two sub-plants.

Each of the sub-plants 15(1), 15(2) has its own sub-plant manager Msf(1), Msf(2) who manages the respective sub-plant. Each sub-plant 15(1), 15(2) comprises its own workspace 17(1), 17(2).

Instead of one workspace 17(1), 17(2) per sub-plant 15(1), 15(2), a plurality of sub-workspaces can be provided, linked by means of conveyor belts.

The output of each sub-plant leaves the main plant 7 via the exit 11. The sub-plants could, for example, be for processing data from different days of the month. In FIG. 2 it is indicated that sub-plant 15(1) is for processing the data from day 6, while sub-plant 15(2) processes the incoming data for day 7. The process carried out in each sub-plant could, for example relate to the valuing of call data, which may be dependent on the day of the month or the day of the week.

Within the schematic shown in FIG. 2, it is for example also possible to open an extra sub-plant for a particular day on which a sub-plant is already open if it turns out that the volume of data to be processed is too large for the sub-plant already open. This is controlled by the plant manager Mf. Each of these open sub-plants has its own data on which operations are carried out or from which new data are derived. Different sub-plants do not make use of the same data, so that each of the sub-plants operates in its own state.

Within the schematic of FIG. 2 it is also possible to open further sub-plants and to assign to each open further sub-plant a new stream of subjects to be handled, which is split off from the main entrance stream.

In the schematics shown in FIGS. 1 and 2, the main and sub-responsibilities for the platform manager Mp, the plant manager Mf, and the sub-plant managers Msf are clearly defined by means of a hierarchical structure. The structure shown in FIGS. 1 and 2 can be translated into a functional design for the envisaged system, as shown in FIG. 3.

2. Separation Between Business Functionality and Implementation Functionally

Figure 3:
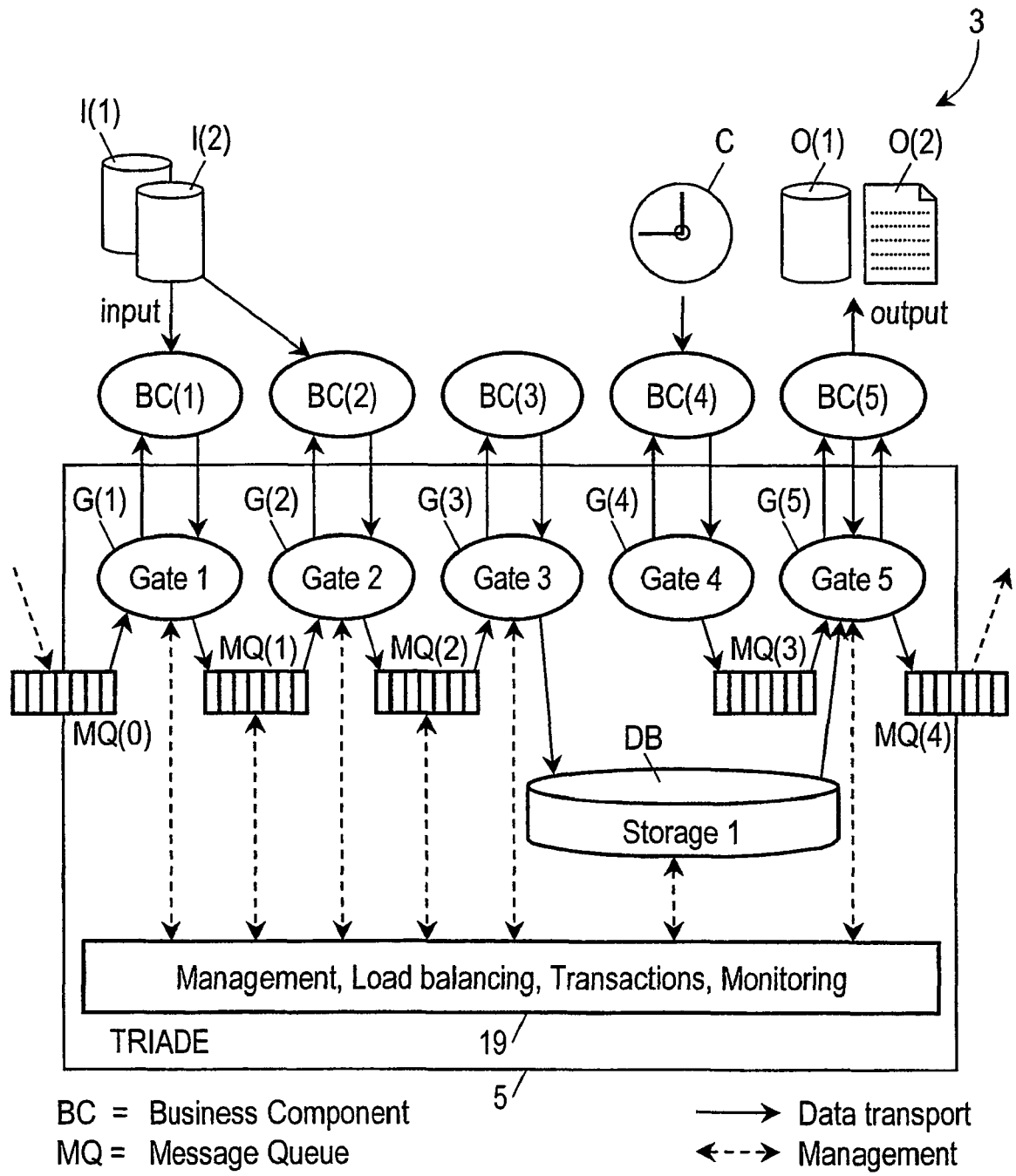
FIG. 3 shows an embodiment of the software architecture according to the invention.

FIG. 3 shows a possible implementation of the platform 5 and some external applications 3. The platform 5 provides the implementation functionality, while the external applications 3 constitute the business functionality. Together they are able to process individual data streams on a stream-by-stream basis in a very efficient and reliable way. An example of such functionality is CDR (Call Detail Record) processing. Then, data related to individual payment transactions, e.g., debiting from an account is collected and processed to present it in a predetermined format to an account holder.

The platform 5 comprises a plurality of gates G(j), j=1, 2, . . . , J, of which 5 are shown by way of example. The gates G(j), together with the applications 3, are comparable with one or more workspaces from FIGS. 1 and 2. Furthermore, the internal platform 5 comprises a plurality of message queues MQ(k), k=1, 2, . . . , K, of which 3 are shown by way of example, a database DB and platform management processes 19. Of course, several databases can be provided, if necessary. The platform management processes 19 are shown as one block. These processes can be implemented on one processor, on several parallel processors or on a network of processors. If there are several computers, they are connected to one another via a network (for example an intranet).

The external applications 3 include business components BC(j) (one business component BC(j) corresponds with each gate G(j)), entry components I(m), m=1, 2, . . . , M, of which 2 are shown, and output components O(n)=1, 2, . . . , N, of which likewise 2 are shown, and a clock C.

Each component within the platform 5 has its own manager, i.e., is controlled by a program part designed specially for this purpose in the platform management processes 19. This is indicated by the dotted lines between the platform management processes 19 and the other components in the platform 5. The platform 5 itself also comprises a manager—the platform manager—and only this manager has no manager higher in the hierarchy. What is shown in FIG. 3 can be conceived as a platform with one "plant" with several "workplaces" (G(j)) which are linked to one another by "conveyor belts" MQ(k). There is a strict hierarchy: the highest in the hierarchy is the platform manager, who manages all plant managers, who in turn manage gate managers, message queue managers and database managers. These managers all form part of the platform management processes 19. Status reports are kept for each component and sent "up" via the hierarchical lines so that managers are aware of the condition of that part of the system for which they are responsible.

Such a management hierarchy enables the different components of the architecture to be distinguished from one another and managed separately. Such a hierarchical architecture is easier to upscale or downscale than an architecture with only one manager. Moreover, the reliability is enhanced because failure, for example, can take place at the level of the various "plants" and does not need to happen at the level of the entire system.

Each business component BC(j) is started by a corresponding gate G(j) and represents a particular business functionality, for example the acceptance of a call record of a telephone call, the calculation of the price and the refunding of the calculated price to the corresponding gate G(j). Starting can, e.g., be done in a runtime environment, e.g., by means of MS Com+™ or Enterprise Javabeans™. Another example: a business component BC(j) could accept all available call records from one customer, determine the appropriate bill and report the bill in the form of a data structure to the corresponding gate G(j). Business components BC(j) do not form part of the internal platform 5 and can be acquired by external software developers. They can, as it were, be "plugged" into the platform 5, on condition that they are provided with a suitable interface to enable them to communicate with a corresponding gate G(j). The business components BC(j) are themselves "stateless" and non-transactional. The business components BC(j) perform transformations by which data can be changed. All components that can perform a particular process step on particular data and therefore can change a state of the data are located within the platform 5. If necessary, a business component can participate in a transaction which takes place within the platform 5. Conceptually, however, there is a strict distinction: transactions within and transformations outside the platform 5. That is why the changes are only effectuated under the control of the platform 5.

Monitoring of the integrity of the management hierarchy, i.e., whether or not the gates G(j) are still functioning well is done by the platform management process 19. They are also capable of restoring faulty gates G(j).

There are various types of gates:
A plant entry gate G(1); this is the gate belonging to the first business component BC(1);
A plant exit gate G(5); this is the gate belonging to the last business component G(5);
A platform gate G(1); this is the gate belonging to the first business component BC(1) in the main plant;
A base gate G(j); this is the gate belonging to each random business component BC(j);

It should be noted that each gate could combine several types of gates. The gate G(1) that for example belongs to the first business component BC(1) is a platform gate as well as a plant entry gate and also a base gate. The correct functions of the gate will be activated according to the type of gate.

Each gate provides a gate business component interface. In an embodiment the business component BC(j) can access a particular subset of data by means of one or more key values ("keys" in database terminology). This makes it possible, in the case of intermediate storage in a database, where ordering of data can be relevant, to specify a preference for particular data, for example particulars of a specific customer.

The data within the platform are usually held in the message queue MQ(k). Instead of this, however, it is possible for data to be stored in the database DB. This is usually done if it is wished to store data for a lengthy period and it is wished to be able to select subgroups of these data, for example in order to select data for a particular customer. In this case, the gate supports a connection with the database DB instead of storage in a message queue MQ(k). This applies for example for gate G(3). Thus, database DB functions as a buffer an can be made with standard database technology.

The functions of each base gate G(j) are as follows:

the gate starts the corresponding business component BC(j);

the gate handles process steps on behalf of the corresponding business component BC(j). If something happens with the corresponding business component BC(j) during the processing, the gate will interrupt the process step. Moreover, the gate G(j) will undo the process step, start a new BC(J) to perform the same process step. If this results again in an error, the gate manager will report this to the manager higher in hierarchy.

The gate will determine a weighting factor for the entry data in a process step and redistribute it over the exit data from this process step. If data have a weighting factor "0", this will be interpreted as an error.

The gate will report to its own manager, the so-called gate manager, the number of generated or reduced data units. The gate will determine this number by calculating the difference between the number of entry data units sent to the business component BC(j) and the number of exit data units received from the business component BC(j).

The above-mentioned weighting factor per entry data unit will be assigned by the platform gate.

The plant entry gate G(1) will report to its gate manager the total number of entry data units per transaction and the total weighting factor for these entry data units. The plant exit gate G(5) will report to its gate manager the total number of exit data units per transaction as well as the total weighting factor for these exit data units. The total weighting factor for the entry data units compared with the total weighting factor for the exit data units allows for platform evaluation. A detailed explanation of using weighting factor is given in section 4.

The function of the message queues MQ(k) is to hold data in a safe manner, as well as to transport data between the successive gates G(j).

It can be seen that the internal platform 5 provides for implementation functionality, such as:

system configuration and installation;
operational management and the necessary user interfaces;
reliable data transport;
evaluation and accounting;
transactional processing of data (ACID=atomicity, consistency, isolation, durability);
load distribution; e.g., when too much data is arriving for existing business components BC(j) to handle, the platform management processes can initiate a further business component BC(j) to assist;
calling and control of the business components BC(j).

Each business component BC(j) can be designed, built and executed as a straight-forward transformation of offered data and can confine itself to carrying out the transformation and returning of processing results. The transformation is specified in terms of business requirements and functional requirements of the system to be built. The other, more system oriented and implementation oriented aspects fall within the internal platform 5.

A functional explanation will now be given of the steps that can be taken within the example of the architecture shown in FIG. 3.

1. Transaction data to be processed arrive on the platform 5 in the form of files I(1), I(2). Alternatively, data to be processes is stored in a first, input message queue MQ(ø). This can be done by reference, in the form of a file with a name referring to the actual file.
2. Gate G(1) periodically starts a transaction and then calls business component BC(1).
3. Business component BC(1) detects the file to be processed and then opens the file. The business component BC(1) detects the file by its name, whether or not this file is initially stored in message queue MQ(ø) or in a separate data store outside the platform 5.
4. Business component BC(1) reads the file name of this file and the corresponding location and sends the file to gate G(1).
5. Gate G(1) stores the data from the file in message queue MQ(1).
6. If gate G(1) was able to store the relevant data, this is executed by gate G(1) and the process step of G(i) is closed.

The business functionality applied in steps 1 to 6 by the business component BC(1) relates to the location, extension, and naming convention of the files to be received.

7. Gate G(2) detects a message in message queue MQ(1), starts a next process step and reads the message.
8. Gate G(2) calls business component BC(2) with this message, the name and the location of a file to be processed.
9. Business component BC(2) opens the file, reads the corresponding transaction data and sends them to gate G(2).
10. Gate G(2) stores the individual transaction data in message queue MQ(2).
11. If gate G(2) was able to store the data, this is executed by gate G(2) and the process step of G(2) is closed.

The business functionality performed by business component BC(2) in steps 7 to 11 relates to: format and record layout of the files to be received.

12. Gate G(3) detects transaction data in message queue MQ(2), starts a further process step and reads in a number of transaction data.
13. Gate G(3) calls business component BC(3) with the read-in transaction data.
14. Business component BC(3) carries out a predetermined transformation and sends the results to gate G(3).
15. Gate G(3) stores the processing results in database DB.
16. If gate G(3) was able to store the data, this is executed by gate G(3) and the process step of G(3) is closed.

The business functionality performed in steps 12 to 16 by business component BC(3) relates to: format and field layout of transaction data, record and transformation specification.

17. Gate G(4) periodically starts a next process step and then calls business component BC(4).
18. Business component BC(4) contains a scheduler and, triggered by clock C sends an event message to gate G(4). The clock C provides the trigger times for the scheduler, e.g., based on a list of events.
19. Gate G(4) stores the event message in message queue MQ(3).
20. If gate G(4) was able to store the event message, gate G(4) does that and the process step of G(4) is closed.

The business functionality performed in steps 17 to 20 by business component BC(4) comprises: scheduler functionality in which it is determined that a particular business event must take place.

21. Gate G(5) detects the event message in message queue MQ(3), starts a next process step and reads the event message.
22. Gate G(5) calls business component BC(5) with this event message.
23. Business component BC(5) interprets the event message.
24. Business component BC(5) formulates a request to retrieve specific data from database DB and sends these specific data to gate G(5).
25. Gate G(5) retrieves the requested data from database DB and sends them to business component BC(5).
26. Business component BC(5) performs a transformation on the data and produces output, for example in the form of a file O(1) or paper output O(2). The output can also have any other customary form, for example an automatic e-mail. As a further alternative, an output message is sent to gate G(5) which stores it in output message queue MQ(4).
27. If gate G(5) receives a confirmation from business component BC(5), the process step of G(5) is closed. (If gate G(5) stores the output message in output message queue MQ(4) it directly terminates its process step).

The business functionality performed in steps 21 to 27 by business component BC(5) comprises: interpretation of the event message, selection of relevant data and transformation thereof into performance.

3. Configuration and Management Concept

Figure 4:
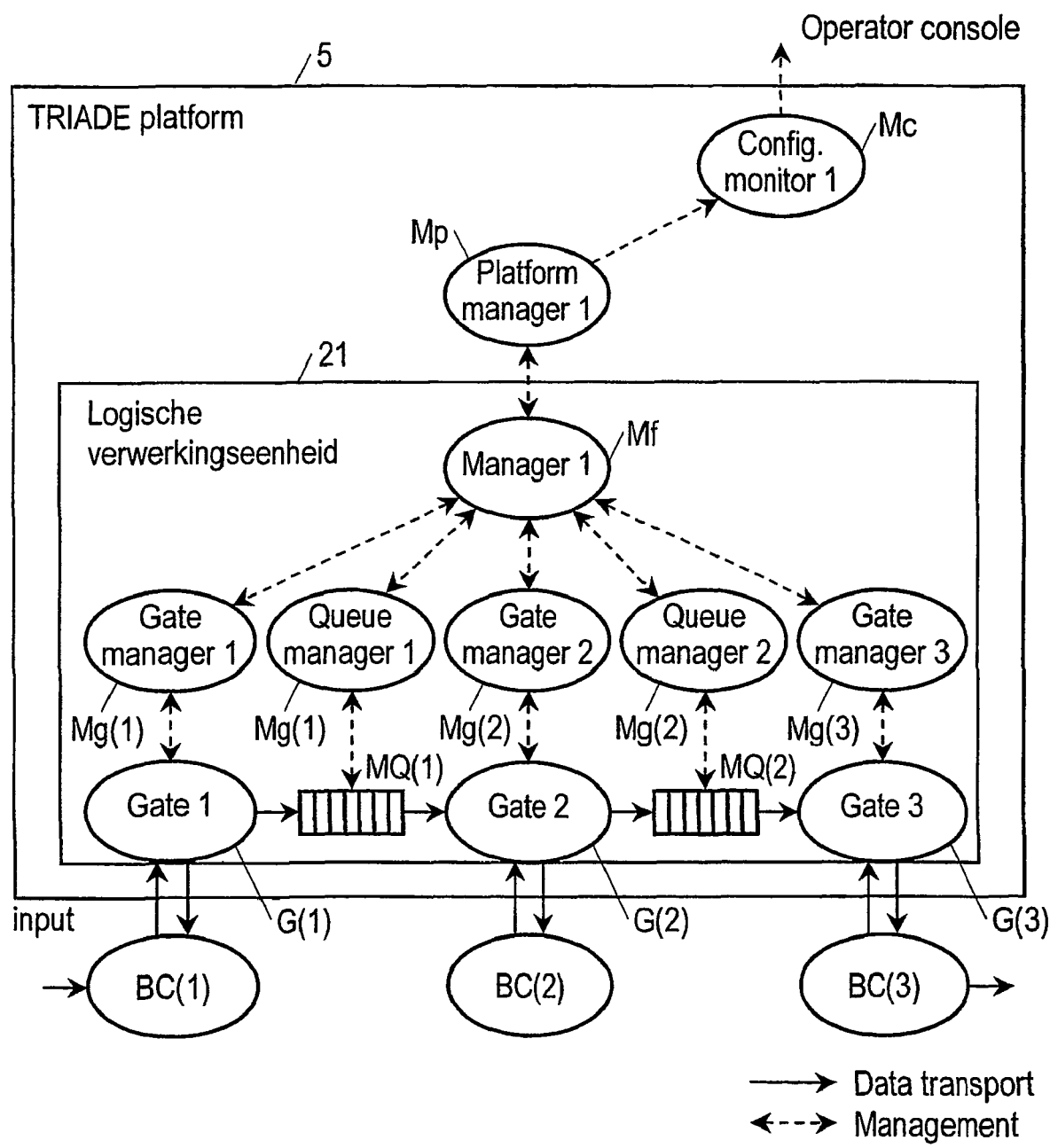
FIG. 4 shows the hierarchy of various managers defined in the invention, i.e. software control modules.

The management hierarchy provides a manner to achieve operational and functional management by means of aggregating and distributing information about the operation of the platform 5 via a hierarchy of management components within the platform 5. FIG. 4 shows an example of a management hierarchy in accordance with the invention.

The platform manager Mp can send management data to a configuration monitor Mc. In addition, management data can be exchanged between the platform manager Mp and the processing unit manager Mf. The processing unit manager Mf is comparable to a plant manager from FIGS. 1 and 2 and controls various other managers within the "plant", which in computer terms could for example be a logical processing unit 21. If there are several logical processing units, which for example communicate with each other via a network, there are also several processing unit managers Mf, namely one per logical processing unit.

The other managers include a number of gate managers Mg(j) and message queue managers Mq(k). The gate managers Mg(j) control the gates G(j). The message queue managers Mq(k) control the message queues Mq(k). The other reference numbers in FIG. 4 refer to analogous components as in the previous figures.

The processing unit manager Mf, the gate managers Mg(j) and the message queue managers Mq(k) all belong to the platform management processes 19.

The various managers who form part of the platform management processes 19 have the following functions.

The tasks of the platform manager Mp are as follows:
  The platform manager Mp takes care of starting the supporting platform components and the processing unit manager(s) Mf when the platform 5 is initialized.
  The platform manager Mp must respond to error messages, for example by restarting or relocating components. Error recovery algorithms may be further developed than merely the switching off or restarting of a component that has a problem. If an error cannot be solved automatically by the platform manager Mp, this is announced via the configuration monitor Mc to the operator.
  The configuration monitor Mc must send a sign of life to the platform manager Mp. If such a message is not sent, the platform manager Mp will restart the configuration monitor Mc. The platform manager Mp will then also send instructions to all subordinate managers to enable state reports of all components from the platform 5 to be sent to the configuration monitor Mc.

The processing unit manager Mf controls the entire logical processing unit 21 and has as subordinates the message queue managers Mq(k), gate managers Mg(j) and database managers (not shown in FIG. 4).

The processing unit manager Mf has five functions:
1. When data arrive at the logical processing unit 21, the processing unit manager Mf starts the components within the logical processing unit. Those parts which have not yet received data are not started.
2. In most cases, logical processing units ("plants") will not be closed, because when no data need to be processed all gates and business components are included in a group and so most of the resources which are claimed by a logical processing unit will be free.

In some cases, however, for example if a plant processes data for a limited period, the plant will have to be closed after some time. The processing unit manager Mf will then receive a closure message. Such a message differs from a stop message, because data may be present in a stopped plant. If the processing unit manager Mf receives a closure message, he will want to check that the plant does not contain any data. If this is the case, the processing unit manager Mf will make all subordinate managers stop, check whether the plant is in balance (see also below under 5) and store all relevant information such as logs and internal states in a safe place for reference.
3. The processing unit manager Mf must respond to error messages, for example by restarting or relocating components. The discovery of errors at this level is always within the context of the logical processing unit 21. If problems occur outside the logical processing unit 21, these cannot be solved. Such problems can only be reported to the platform manager Mp (or a superior processing unit manager if present).
4. The processing unit manager Mf receives reports from his message queue managers Mq(k). Based on these reports, the processing unit manager Mf can decide to duplicate any business components BC that may be present, and consequently gates and gate managers with which business components have a one-to-one relationship. This can occur if the processing unit manager Mf observes that one of the message queues MQ(k) is too large. The processing unit manager Mf will additionally have to explicitly monitor the statistics of the gates G(j) in order to determine whether the number of business components BC(j) can be reduced.
5. The processing unit manager Mf receives all entry weighting factors and exit weighting factors of the logical processing unit 21 via the gate managers Mg(j). It is the responsibility of the processing unit manager Mf to calculate these and, after failure of the logical processing unit 21, take stock of the situation. Furthermore, the processing unit manager Mf can ask all message queue managers Mq(k), database managers and any sub-processing unit managers to notify him of the weighting factors present at that moment in the logical processing unit 21. In this way, the processing unit manager Mf can determine whether the logical processing unit 21 is in balance, even if data are present within the logical processing unit 21.

Each message queue manager Mq(k) has the following three functions.

1. The message queue manager Mq(k) monitors the message queue MQ(k) continuously and reports to the processing unit manager Mf in the following cases:
   a message queue MQ(k) receives original data, so that the components situated downstream can be activated;
   a particular message queue MQ(k) grows beyond a predetermined threshold value that was configured beforehand as part of the properties of the relevant message queue MQ(k). If this message queue MQ(k) subsequently falls below this threshold value, this will also be reported to the processing unit manager Mf;
   a message queue MQ(k) attains its maximum size.
2. Message queue managers Mq(k) initialize the corresponding message queue MQ(k). The message queue manager Mq(k) is balanced in respect of load.
3. On request, the message queue manager Mq(k) will determine the weighting factor of the data present in the message queue and report this to the processing unit manager Mf.

The gate managers Mg(j) have two functions:
1. When data arrive, the gate manager Mg(j) will initiate a gate G(j).
2. The gate manager Mg(j) is responsible for sending on the gate statistics to the processing unit manager Mf.

The database manager (not shown in FIG. 4) has three functions.
1. The database manager monitors the database DB continuously for errors and will report these to the processing unit manager Mf.
2. Each database manager will start his corresponding database DB, assuming that this has been correctly initialized. Otherwise an error will be reported to the processing unit manager Mf. Databases are not balanced in respect of load.
3. On request, the database manager will determine the weighting factor of the data present at that moment in the database DB and report this to the processing unit manager Mf.

An explanation will now be given of the steps followed by the managers shown in FIG. 4.
1. Transaction data to be processed arrive on the platform 5 in the form of files I(1), I(2).
2. Gate G(1) periodically starts a transaction and calls business component BC(1).
3. Business component BC(1) detects the data to be processed and sends them to gate G(1).
4. Gate G(1) stores these data in message queue MQ(1).

The functionality of the steps 1 to 4 relates to: the inclusion of data in the platform 5.

5. Business component BC(2) is not available on account of an internal error.
6. Message queue MQ(1) exceeds a predetermined limit with regard to filling with data.
7. The message queue manager Mq(1) detects this overrun and reports this to the plant manager Mf of the logical processing unit 21.
8. Gate G(2) detects that business component BC(2) is not responding and informs the gate manager Mg(2).
9. Gate manager Mg(2) reports the error situation to the processing unit manager Mf of logical processing unit 21.

The functionality in steps 5 to 8 relates to: the detection of—in this example—an incorrect situation in the platform 5.

10. Processing unit manager Mf archives the information received in steps 7 and 9 and determines a necessary action in a heuristic manner.
11. The processing unit manager Mf reports to the platform manager Mp that business component BC(2) is in an error situation and that the data processing is blocked.
12. The platform manager Mp warns the operational administrator via the configuration monitor manager Mc.
13. The processing unit manager Mf instructs the gate manager Mg(1) and the message queue manager Mq(1) to stop the data processing.
14. The gate manager Mg(1) instructs the gate G(1) to pause so that no new transactions are set up.
15. The message queue manager Mq(1) instructs the message queue MQ(1) to pause.

The functionality in steps 10 to 15 relates to: taking action in the management hierarchy in response to the detection of an error. It will be clear that the above-mentioned steps 1 to 15 are only an example given to illustrate the hierarchical structure of FIG. 4.

Because the operational administrator has been notified in step 12 of the error situation, he can intervene and correct any errors. He can then restart the system.

The architecture described above can be implemented with the aid of one or more computers, which for example are linked to one another by means of a network, for example a LAN (local area network) or a WAN (wide area network). Use can be made hereby of a standard operating system, for example Microsoft Windows 2000, a message queuing service, for example Microsoft Message Queues, a component creation and communication service, for example Microsoft DCOM (distributed component object model), a distributed transaction co-ordinator, for example Microsoft MTS (Microsoft transaction server), and a database system, for example Microsoft SQL server (SQL=structured query language). The message queuing service and the database service must be able to participate in transactions under the control of the transaction co-ordinator.

The above-described architecture is flexible in many respects. First of all, the business components BC(j) can be adapted or replaced individually. It is also simple to add new gates G(j) and a corresponding business component BC(j) within the outlined architecture. It is equally simple to add new "plants" in the form of logical processing units 21, with a similar structure as shown in FIG. 4. This means that changes can be implemented at a low level without the whole system having to be stopped.

The proposed architecture leads to lower costs for processing transaction data than is currently possible, with equivalent or even better performance, reliability and adaptability.

4. Using Weighting Factors

Above, the use of weighting factors for platform evaluation has been discussed briefly. Below, a more detailed explanation will be given.

In any transaction data processing system it is important to provide an as high as possible, amount of certainty about the proper functioning of the system. This is especially true for billing systems.

The probability of certainty depends on many factors among which the quality of the process of software creation and software maintenance, the quality of the input data, the quality of the operational process, guarantees in the software applications themselves, reporting mechanisms, etc. Many countermeasures are directed to avoiding error situations. I.e., software is to be delivered with an as high as possible quality. However, measures are known to sense error situations and to find the errors causing the error situation. In situation where transaction data is processed in batches, at the end of each run of a batch, a process report will be made up in which different countings are compared with one another. Typically, these relate to countings at the input and the output side of the processing system, e.g., number of records, number of call minutes in the incoming/outgoing records, etc. These are very important reports but due to the character of the data in these reports they are application specific. In other words, a platform will not automatically be able to generate them. Therefore, costs are necessary to create the software and to maintain the software. Adding rules of code in the software introduces new chances of errors.

It is observed that, in case more checks are performed, this might have a synergistic effect, provided these checks on the proper functioning are mutually independent. The chance that an error remains undetected after a number of checks equals the product of the individual chances that the error remains undetected in each individual check. Therefore, it might be very effective to introduce additional checks on proper functioning, provided they are independent. The "weight" used in the transaction processing system explained above, are such a mechanism which operates independently from both application directed balancing and from mechanisms of monitoring drop out of machines and processes as provided by the management mechanisms explained above. In other words, these "weights" are an addition to other measures and are independent thereof. Therefore, they provide better security due to the synergetic effect.

The "weights" can be performed automatically by the platform. They can be applied in two different ways: as a means to check whether or not data has been lost but also as an independent check whether or not a series of transaction data processing units G(1), . . . G(5) is "empty", i.e., is not busy processing any transaction data streams (no "work in progress" anymore). This may be important in situations in which one wishes to "close" periodically a transaction or if one wishes to substitute an existing series of translation data processing units G(1) . . . G(5) for an amended series of transaction data processing units. In the latter case, one has to know when the current series of transaction data processing units may be closed.

It is noted that the "weights" are not intended to recover of errors but to signal the existence of errors to predetermined processing units or other means available for error recovery, including manual procedures.

The purpose of using "weights" is to determine whether or not all input transaction data streams items entering the platform 5 are also leaving the platform 5 at the output side. This is also true for all side products developed during processing, aggregating, etc. Alternatively, using the mechanism of "weights" provides the possibility of evaluation whether or not there is still work in progress in the platform 5. The mechanism is independent of the application logic and largely independent of the correct functioning of the management hierarchy.

A more detailed explanation of the mechanisms is as follows.

Every transaction data stream item entering the platform 5 obtains a (virtual) strictly positive weighting factor. This is done by input gate G(1), which records a total amount of weighting factors provided to all input data. The total amount of weighting factors may be reset periodically through a management action by factory manager Mf. All transaction data stream items carry the associate weighting factor with them as an additional information. this is invisible for the business components BC(j) but not for the gates G(1) . . . G(5).

When a gate reads a number of transaction data stream items from his input, e.g., from a message queue MQ(k), offers these items to a business component BC(j) and receives the results from the business component BC(j), the gate will redistribute the total weight of the read transaction data stream items over all output items. All weighting factors must be strictly positive. Then, the results are written to the output and only then, the transaction will be closed. In this way, the total amount of weighting factors will be kept constant. When leaving the platform 5, a total amount of weighting factors is determined. Any time, via the management hierarchy or directly via an operator action, it can be established whether or not the total amount of weighting factors at the input of the platform 5 equals the total amount of weighting factors at the output of the platform 5. This information can be compared with other information determined in another way, relating to the amount of work in progress in the platform 5, e.g., by requesting the message queue managers and database managers in the platform 5. When this information is incorrect, there is a platform error. Either data is missing or added between transaction processing steps made by the gates or something is wrong with the resource managers or the resources managed by them.

The software codes to allow such a functioning of the platform 5 is part of the platform 5 and needs only be developed and tested once. This is an advantage from a cost point of view. But it also offers a higher chance of being errorless than when it is developed as application specific code.

There are at least two reasons why the proposed mechanism of adding weighting factors to the transaction data stream is advantageous.

First of all, middleware, such as databases and message queues, may contain errors as well. An independent check to prevent this is always good, especially then, when they can be developed against low costs.

Secondly, in the concept of the platform 5 as disclosed above, transaction data streams items are "consumed" when they are processed. Input for a business component BC(j) may and should only be used once. Standard message queues have the feature that after data has been read from the message queue this data is not available anymore to be read once again. Therefore, the message queues are monitoring unintended double use of data. However, when a database DB is used as a buffer, this may, in general, not be true anymore. After a gate has read data from a data buffer, it must explicitly remove the data from the database DB. Therefore, an error in the software code of a gate can result in data being read more than once. E.g., a telephone call could be charged more than once. The opposite might also happen, i.e., data being removed prior to being processed. Then, e.g., telephone calls will never be charged to the user. Both such situations will be detected by the mechanism of using weighting factors. The weighting factors provide an independent mechanism to check the correctness of the software codes in the gates. Although being platform code and thus being most probably correct, it may contain errors which are hard to find if present.

The mechanism of using weighting factors is especially important in systems as described above in which no central "state" is recorded as in traditional database or file based systems. The mechanism provides an independent check on the guarantees that are theoretically offered by using middleware, such as transaction integrity during reading from and writing to message queues and databases, and correctness of the software codes in the gates providing the access to the resources.

Although being of specific importance in systems as described here, it is observed that the mechanism of weighting factors can also be used in other kinds of transaction processing systems, like traditional database or file based systems processing transactions in batches.

The invention claimed is:

1. A data processing system comprising:
a plurality of processors, including a first processor and a second processor;
one or more input interfaces for providing input transaction data streams to the data processing system;
one or more output interfaces for outputting output transaction data streams;
a first series of transaction processing units, including a first transaction processing unit configured to operate on the first processor and a second transaction processing unit configured to operate on the second processor, the first series further configured to process an input transaction data stream received at the one or more input interfaces into an output transaction data stream by way of a series of intermediate processing steps, each step carried out at a respective one of the first series of transaction data processing units, and each step generating respective intermediate transaction processing data; and
one or more memory units communicatively interconnecting pairs of the transaction processing units, including at least a pair consisting of the first transaction processing unit and the second transaction processing unit, the one or more memory units further being configured to store the respective intermediate transaction processing data, and to communicate the respective intermediate transaction processing data between the interconnected pairs of the transaction data processing units as the series of intermediate processing steps is carried out,
wherein the first series is further configured to add an input weighting factor to the input transaction data stream, determine an output weighting factor associated the output transaction data stream, and compare the input and output weighting factors with one another to establish whether or not an error has occurred during processing of the input transaction data stream.

2. The data processing system of claim 1, wherein each transaction processing unit comprises a gate,
wherein each of the one or more memory units is one of a message queue configured for temporary storage of data on a first-in-first-out basis, a buffer configured for temporary storage of data on a random basis, or a database for persistent storage of data,
and wherein the data processing system further comprises a platform with at least one logical processing unit, the at least one logical processing unit comprising:
at least one series of the one or more series of transaction data processing units, the at least one series comprising an entry gate, an exit gate, and zero or more intermediate gates; and
at least one of the one or more memory units.

3. The data processing system of claim 2, wherein each given gate comprises a software module including computer-executable instructions that, when executed by at least one of the plurality of processors, cause the data processing system to:
retrieve an input set of data from one of the one or more memory units;
start up a business component associated with the given gate and configured to carry out a predetermined transformation of the retrieved input set of data;
send the retrieved input set of data from the given gate to the associated business component;
receive a transformed set of data from the associated business component, the transformed set of data having been created by the predetermined transformation of the retrieved input set of data by the associated business component; and
store the transformed set of data in one of the one or more of the memory units.

4. The data processing system of claim 2, wherein at least one of the one or more input interfaces comprises a message queue.

5. The data processing system of claim 4, further comprising a hierarchical structure of managers, each manager of the hierarchical structure comprising a software module including computer-executable instructions that, when executed by at least one of the plurality of processors, cause the data processing system to control one of: (i) a gate, (ii) a message queue, (iii) a buffer, (iv) the at least one logical processing unit, and (v) the platform.

6. The data processing system of claim 5, wherein the hierarchical structure of managers comprises:
for each gate, a gate manager including one of:
an entry gate manager for control of the entry gate,
an exit gate manager for control of the exit gate,
and an intermediate gate manager for control of a corresponding one of the zero or more intermediate gates;
for each message queue, a message queue manager for control of the corresponding message queue;
for each buffer, a buffer manager;
for the at least one logical processing unit, a plant manager for control of each gate manager, each message queue manager, and each buffer manager; and
a platform manager for control of the platform.

7. The data processing system of claim 6, wherein the platform manager comprises a software module including computer-executable instructions that, when executed by at least one of the plurality of processors, cause the data processing system to:
initialize platform components;
handle error messages within the platform; and
communicate with a configuration monitor manager that is configured to communicate with an operator of the data processing system.

8. The data processing system of claim 6, wherein the plant manager comprises a software module including computer-executable instructions that, when executed by at least one of the plurality of processors, cause the data processing system to:
initialize components within the at least one logical processing unit that are associated with the plant manager and which support a data transaction;
close operation of the at least one logical processing unit upon receiving an instruction from the platform manager to close the at least one logical processing unit;
handle errors within the at least one logical processing unit associated with the plant manager; and
adjust the number of gates operating in the at least one series based on a number of transactions being processed.

9. The data processing system of claim 6, wherein the plant manager further includes computer-executable instructions that, when executed by at least one of the plurality of processors, cause the data processing system to determine entry weighting factors and exit weighing factors of the at least one logical processing unit, and to determine whether the at least one logical processing unit is in balance with respect to a load of transactions being processed.

10. The data processing system of claim 6, wherein each given message queue manager comprises a software module including computer-executable instructions that, when executed by at least one of the plurality of processors, cause the data processing system to:

initialize a message queue assigned the given message queue manager; and monitor the message queue assigned the given message queue manager.

11. The data processing system of claim 6, wherein each given message queue manager comprises a software module including computer-executable instructions that, when executed by at least one of the plurality of processors, cause the data processing system to:

determine a weighting factor of data that are present in a message queue assigned the given message queue manager.

12. The data processing system of claim 6, wherein each gate manager comprises a software module including computer-executable instructions that, when executed by at least one of the plurality of processors, cause the data processing system to:

initiate a gate assigned to the gate manager upon arrival of data at the assigned gate; and collect gate statistics from the assigned gate and send them to the plant manager.

13. The data processing system of claim 6, wherein each buffer manager comprises a software module including computer-executable instructions that, when executed by at least one of the plurality of processors, cause the data processing system to:

start up a buffer assigned to the buffer manager; and monitor the buffer assigned to the buffer manager.

14. The data processing system of claim 6, wherein each said buffer manager comprises a software module including computer-executable instructions that, when executed by at least one of the plurality of processors, cause the data processing system to:

determine a weighting factor for data that are present at a particular moment in the buffer assigned the buffer manager.

15. The data processing system of claim 1, wherein the plurality of processors comprise a plurality of personal computers configured to communicate with one another.

16. The data processing system of claim 15, wherein the personal computers are configured to communicate with one another via of a network.

17. The data processing system of claim 16, wherein the network is selected from the group consisting of a LAN and a WAN.

18. In a data processing system including one or more processors, a method for processing transaction data, the method comprising:

receiving input transaction data streams at one or more input interfaces of the data processing system;

outputting output transaction data streams at one or more output interfaces of the data processing system;

at one or more series of transaction processing units configured to operate on the one or more processors, processing the input transaction data streams received at the one or more input interfaces into the output transaction data streams by way of a series of intermediate processing steps, each step being carried out at a respective one of the transaction data processing units, and each step generating respective intermediate transaction processing data; and at one or more memory units communicatively interconnecting pairs of the transaction processing units, storing the respective intermediate transaction processing data, and communicating the respective intermediate transaction processing data between the interconnected pairs of the transaction data processing units as the series of intermediate processing steps is carried out; and at the one or more series, further adding an input weighting factor to at least one of the input transaction data streams, determining an output weighting factor associated at least one of the output transaction data streams, and comparing the input and output weighting factors with one another to establish whether or not an error has occurred during processing of the at least one of the input transaction data streams.

19. A non-transitory computer-readable medium having computer-executable instruction stored thereon that, when executed by one or more processors of a data processing system, cause the data processing system to perform functions comprising:

receiving input transaction data streams at one or more input interfaces of the data processing system;

outputting output transaction data streams at one or more output interfaces of the data processing system;

at one or more series of transaction processing units configured to operate on the one or more processors, processing the input transaction data streams received at the one or more input interfaces into the output transaction data streams by way of a series of intermediate processing steps, each step being carried out at a respective one of the transaction data processing units, and each step generating respective intermediate transaction processing data; and at one or more memory units configured to communicatively interconnect pairs of the transaction processing units, storing the respective intermediate transaction processing data, and communicating the respective intermediate transaction processing data between the interconnected pairs of the transaction data processing units as the series of intermediate processing steps is carried out; and at the one or more series, adding an input weighting factor to at least one of the input transaction data streams, determining an output weighting factor associated at least one of the output transaction data streams, and comparing the input and output weighting factors with one another to establish whether or not an error has occurred during processing of the at least one of the input transaction data streams.

* * * * *